(12) United States Patent
Jung (10) Patent No.: US 8,451,276 B2
(45) Date of Patent: May 28, 2013

(54) PROGRAM DESIGNED MASTER ANIMATION AND METHOD FOR PRODUCING THEREOF

(76) Inventor: Sang Kug Jung, Nanyangju-si (KR)

( * ) Notice: Subject to any disclaimer, the term of this patent is extended or adjusted under 35 U.S.C. 154(b) by 1004 days.

(21) Appl. No.: 12/443,800

(22) PCT Filed: Apr. 24, 2008

(86) PCT No.: PCT/KR2008/002332
§ 371 (c)(1),
(2), (4) Date: Mar. 31, 2009

(87) PCT Pub. No.: WO2008/118001
PCT Pub. Date: Oct. 2, 2008

(65) Prior Publication Data
US 2010/0097384 A1  Apr. 22, 2010

(30) Foreign Application Priority Data

Mar. 26, 2007 (KR) .................. 10-2007-0029258

(51) Int. Cl.
*G06T 13/00* (2011.01)
(52) U.S. Cl.
USPC .......................................................... 345/473
(58) Field of Classification Search
None
See application file for complete search history.

(56) References Cited

U.S. PATENT DOCUMENTS

| | | | | |
|---|---|---|---|---|
| 6,085,185 | A * | 7/2000 | Matsuzawa et al. | 1/1 |
| 6,301,586 | B1 * | 10/2001 | Yang et al. | 1/1 |
| 6,389,168 | B2 * | 5/2002 | Altunbasak et al. | 382/224 |
| 7,356,838 | B2 * | 4/2008 | Madison et al. | 726/10 |
| 2002/0116716 | A1 * | 8/2002 | Sideman | 725/91 |
| 2002/0156842 | A1 * | 10/2002 | Signes et al. | 709/203 |
| 2005/0144302 | A1 * | 6/2005 | Kirkpatrick et al. | 709/231 |
| 2006/0015904 | A1 * | 1/2006 | Marcus | 725/46 |
| 2007/0067482 | A1 * | 3/2007 | Johnson et al. | 709/231 |
| 2007/0162571 | A1 * | 7/2007 | Gupta et al. | 709/219 |

FOREIGN PATENT DOCUMENTS

| | | |
|---|---|---|
| JP | 2002-271741 | 9/2002 |
| JP | 2004-120279 | 4/2004 |
| JP | 2006-072835 | 3/2006 |
| KR | 10-2005-0071822 | 7/2005 |
| KR | 1020050102521 | 10/2005 |
| KR | 10-2006-0132206 | 12/2006 |
| KR | 10-2007-0016816 | 2/2007 |
| KR | 10-0826959 | 5/2008 |

OTHER PUBLICATIONS

International Search Report mailed Jul. 16, 2008 for PCT/KR2008/002332.
Korean Office Action for 10-2009-7015786, citing the above reference(s).

* cited by examiner

*Primary Examiner* — Ke Xiao
*Assistant Examiner* — Kyle Zhai
(74) *Attorney, Agent, or Firm* — Lowe Hauptman Ham & Berner, LLP (57) ABSTRACT

Disclosed is a PDMA animation production method including the steps of storing animation materials constituting an animation and information separately when a PDMA is produced, the animation materials including texts, graphics, movies, and audios; partitioning frame information as desired, the frame information being construction units of the animation; separating the partitioned frame information into respective information; storing animation information together with information regarding texts, graphics, movies, and audios constituting the animation while interworking with a DB program, the animation information including the frame information; interpreting information stored in the DB program by the PDMA; and retrieving animation sources matching with the interpreted information and combining corresponding data by the PDMA to play the animation.

6 Claims, 11 Drawing Sheets

PROGRAM DESIGNED MASTER ANIMATION AND METHOD FOR PRODUCING THEREOF

CROSS REFERENCE TO RELATED APPLICATION

This application is the National Phase application of International Application No. PCT/KR2008/002332, filed Apr. 24, 2008, which designates the United States and was published in English. The application is hereby incorporated by reference in the entirety into the present application.

TECHNICAL FIELD

The present invention relates to a PDMA-type animation and a method for producing, editing, and distributing the same. More particularly, the present invention relates to a system and a method for providing a program designed master animation so that animations can be produced and edited individually by using a wired/wireless network.

BACKGROUND ART

As generally known in the art, recent development of ultra-high speed network technology and various technologies for compressing video data has created rapidly developing animation service technology using wired/wireless networks. Particularly, animation service technology has played a pivotal role of accelerating communication on the World Wide Web.

Conventional animation services have been provided mainly via TVs by existing public broadcasting media or cabled broadcast providers. However, it has recently become possible for any person having technology/ability to produce/provide animations to service his/her own animations via wired/wireless networks (e.g. Internet) at any time.

As a result, a large number of dedicated Internet broadcasting stations and mobile image service providers have appeared, who provide professional contents in various fields. They have grown a new type of media, the influence of which is comparable to that of existing media and broadcasting stations.

With the aid of recent technology, even laymen with no ability to produce/provide animations can now produce/provide their own animations, i.e. UCC (User Created Contents). This UCC technology is one of the sensational technologies of the Web 2.0 era, and obtains much interest worldwidely. The technology is regarded as having advanced the conventional animation service technology based on wired/wireless networks one step further.

In order to provide animations via networks, one must generally have equipment such as a web server and a streaming server. Therefore, up to now animation service providers having this type of equipment have solely produced animations and uploaded them to servers online so that service subscribers can use them. In other words, laymen without such equipment can hardly produce their own animations and provide them via the web. However, the situation has been changed by the appearance of UCC. As a result, the center of animation services is shifting from service providers to service users or participants. There also appeared a service supporting UCC not only in the web environments, but also in mobile network environments based on cellular phones.

Figure 1:
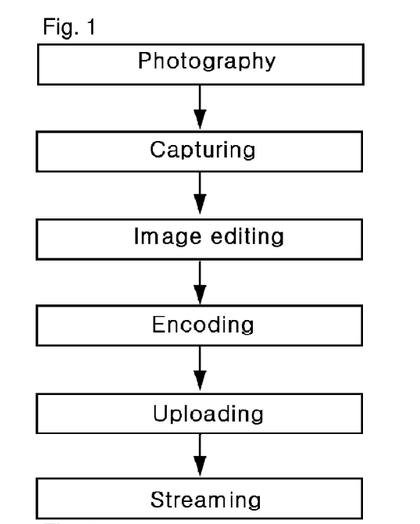
FIG. 1 is a flowchart showing processes of producing and providing animations via networks according to the prior art.

A conventional network-based animation service requires steps of producing and providing animations as shown in FIG. 1, particularly steps of photography, capturing, editing, encoding, uploading, and streaming. However, laymen without professional skills regarding animations cannot easily follow these steps.

FIG. 1 briefly shows conventional technology for producing and providing animations.

The conventional method for producing and providing animations includes the steps of obtaining source images by photography equipment or providing existing image sources, capturing the obtained images or image sources into digital images by using computers, image editing cards, peripheral devices, related image editing programs, etc., and editing and encoding the captured images. The encoded animations are uploaded to the network server and provided to users by streaming equipment.

The conventional technology has a problem in that laymen without skills to handle video equipment or programs cannot easily produce and provide animations. Even in the case of UCC technology, users cannot use it unless they have their own image sources or unless they have the ability to produce animations.

The conventional technology also has a problem in that, once encoded, animations cannot be modified. Particularly, in order to modify an animation that has been encoded, one needs the master source of the animation, which has not been encoded. The master source must be opened by the same image editing program that had originally been used. Then, the master source is modified, edited, and encoded into a new animation. This means that modification of a produced animation requires the corresponding video equipment, image editing program, and image editing technique.

In order to provide encoded animations via wired/wireless networks (e.g. Internet), one must construct his/her own system, such as a web server or a streaming server, and upload animations to it. However, it is unthinkable for an individual to construct such a system. Therefore, individuals need subscription to a site having such a system and use services provided by it. Individuals must also install a specific program provided by the site or a component (e.g. ActiveX) on their PCs to upload animations to the site. Some of the services provided by the site even require payment.

Once an animation has been uploaded on the site in this manner, it cannot be modified any more. This is because, once a user has uploaded an animation to the site, it has no connection to his/her own PC, and the site provides no means to remotely edit the animation via wired/wireless networks. Therefore, if a user wants to modify his/her animation that has been uploaded to a site supporting an animation service according to the prior art, he/she must delete the uploaded animation, retrieve the master source from his/her PC, modify/edit it, newly encode it, and upload it again.

Therefore, it is needed to provide solutions for enabling any person to easily produce animations and upload them to networks to provide animation services. The technology is also expected to enable users to easily edit and modify produced animations; easily select favorite animations and modify and use them as desired; and distribute produced animations to a number of customers so that they can modify the animations by themselves.

DISCLOSURE OF INVENTION

Technical Problem

It is an object of the present invention to provide a PDMA-type animation, which can be easily produced and edited.

It is a further object of the present invention to provide a method for making and distributing PDMA-type animations to customers so that they may edit their own animations via the network.

It is a further object of the present invention to provides a system for producing, editing, and distributing PDMA-type animations.

It is a further object of the present invention to provides a computer-program and computer readable medium storing a PDMA-type animation, a method, or a system for producing the same.

Technical Solution

Firstly the terminology used herein means as below.

A PDMA (Program Designed Master Animation) refers to an animation program for easily modifying and editing images in a broad sense, including animations, still images, pictures, graphics, etc. By using the PDMA, image components and combination information (frame information, etc.) are stored in a DB; components are retrieved from the DB and are edited, exchanged, or modified; components are retrieved, analyzed, recombined, and played; sources are separated; or corresponding frame information is modified and stored.

PDMA Samples refer to various models of images produced in the PDMA type, which can be endowed with different formats, designs, and functions according to the producer's intention.

A PDMA Code refers to a unique identification code assigned to each PDMA sample to identify it.

A Virtual Animation refers to a provisional animation distributed to each client by the PDMA. Particularly, according to VA code information distributed by the PDMA, data constructing an animation, i.e. texts, graphics, movies, audios, and frame information, are combined differently by the PDMA and distributed to each client according to information inputted and selected by the client.

A VA (Virtual Animation) code refers to an identification code for identifying each virtual animation distributed by the PDMA. This code is used to identify the client who has requested animation playback and the PDMA sample selected by the client. According to the VA code information, the DB program searches for different image data for each virtual animation and sends it to the PDMA sample, which then combines an animation of different content and plays it according to the image data.

In accordance with an aspect of the present invention, there is provided a method for producing a PDMA animation, the method including steps of separating animation materials (sources) constituting an animation from a combination of information (frame information) for combining the animation materials and separately storing the animation materials and combination information, the animation materials including texts, graphics, movies, and audios.

The method further includes an editing step of reading materials and information of the PDMA animation, modifying combination information or content of the materials to produce a virtual animation, and separately storing construction materials and combination information of the virtual animation.

The method further includes a step for retrieving and reading each combination information to display the PDMA animation or the virtual animation, retrieving the animation materials based on content of the combination information, and combining the materials to display the animation.

The material information storing step includes an editing step of posting the PDMA animation and the materials on a web so that, when a client accesses the web via a network and modifies the PDMA animation, the combination information or construction material content of the modified PDMA animation is modified to produce a virtual animation, and separately storing construction materials and combination information of the virtual animation.

In accordance with another aspect of the present invention, there is provided a method for distributing a virtual animation, the method including the steps of posting a PDMA sample corresponding to the PDMA animation produced by the method as claimed in claim 1 on a web connected to a wired/wireless network; distributing the PDMA sample as a virtual animation to a number of customers wanting to use the virtual animation by creating a VA code matched with an identification number of each customer; enabling the customer to edit, modify, or produce the distributed virtual animation remotely by a terminal connected to the wired/wireless network; and storing resulting information in a system so that, at a request of each client, the virtual animation specific to the client is displayed.

In accordance with another aspect of the present invention, there is provided a method for playing a PDMA-type animation, the method including the steps of storing animation materials constituting an animation and information separately when a PDMA is produced, the animation materials including texts, graphics, movies, and audios; partitioning frame information as desired, the frame information being construction units of the animation; separating the partitioned frame information into respective information; storing animation information together with information regarding texts, graphics, movies, and audios constituting the animation while interworking with a DB program, the animation information including the frame information; interpreting information stored in the DB program by the PDMA; and retrieving animation sources matching with the interpreted information and combining corresponding data by the PDMA to play the animation.

In accordance with another aspect of the present invention, there is provided a method for distributing a PDMA-type animation, the method including the steps of storing animation materials constituting an animation and combination information regarding combination of the materials separately when the animation is produced, the animation materials including texts, graphics, movies, and audios; producing PDMA samples in a PDMA type so that frame information constituting construction units of the animation can be partitioned as desired and the partitioned frame information can be separately stored as individual information; posting the PDMA samples on a web connected to a wired/wireless network so that the PDMA samples are converted into virtual animations and distributed to a number of customers wanting to use the PDMA samples, the virtual animations having VA codes obtained by combining PDMA codes with customer codes, respectively; and combining materials based on animation construction information conforming to a VA code matching with a customer code of a customer requesting playback of the distributed virtual animation so that the virtual animation is played.

In accordance with another aspect of the present invention, there is provided a system for processing a PDMA-type animation so that the PDMA-type animation can be produced, modified, and edited, the system including a construction means (602) for storing animation materials constituting an animation and combination information regarding combination of the animation materials separately, the animation materials including texts, graphics, movies, and audios, and retrieving the stored materials and combination information to play the animation; a material storing means (606) for separately storing the materials and combination information from the construction means; a DB means (605) for storing a PDMA code regarding each animation and a VA code regarding a virtual animation obtained by modifying each animation; and a control means (601) for controlling the DB means to store or retrieve the PDMA code and the VA code, controlling the construction means to separately store or retrieve the materials and combination information in or from the material storage means, and providing an editing mode when editing is requested so that information regarding the animation can be modified. The system further includes a distribution means (603) for distributing a virtual animation of a PDMA sample played by the construction means (602) to a terminal of a client; and a playing means (604) for receiving the virtual animation from the distribution means (603) and playing the animation.

In accordance with another aspect of the present invention, there is provided a computer-readable recording medium storing a PDMA animation or a PDMA as claimed in claim 1.

Advantageous Effects

The present invention is advantageous in that even laymen having neither professional skills nor dedicated equipment (e.g. photography equipment, image editing equipment, image editing program) can produce and edit their own animations on their terminals by purchasing a PDMA, which can separate and combine sources and data constituting the animation, via the web or storage media.

According to the present invention, separately stored animation sources and data are combined by the PDMA so that, the encoding process, which is conventionally necessary to produce animations, is omitted. Therefore, users can easily modify and edit their animations anytime they want.

Customers can use master animation that has been posted on the web connected with wired/wireless networks so that the uploading process, which is conventionally necessary to provide animations via networks, is omitted.

Animations produced according to the prior art have limited usability, i.e. they can only be used as the producer intends. However, PDMA-type animations produced according to the present invention can be converted into virtual animations and indefinitely distributed to all clients who want to use them. In other words, PDMA-type animations have a substantially wide range of usability and are expected to exert a high degree of economic and cultural influences.

As more animations are produced in the PDMA type according to the present invention, people can select from a wider range of animations and can play animations at any place via various display devices connected to client terminals. As a result, small-scale companies can easily produce and utilize their own CF animations, which are expensive to produce on their own according to the prior art. Therefore, the present invention is expected to facilitate the personal animation service era together with the recent animation service technology, UCC.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

A PDMA provided on the web according to an embodiment of the present invention will now be described with reference to the drawings.

Figure 2:
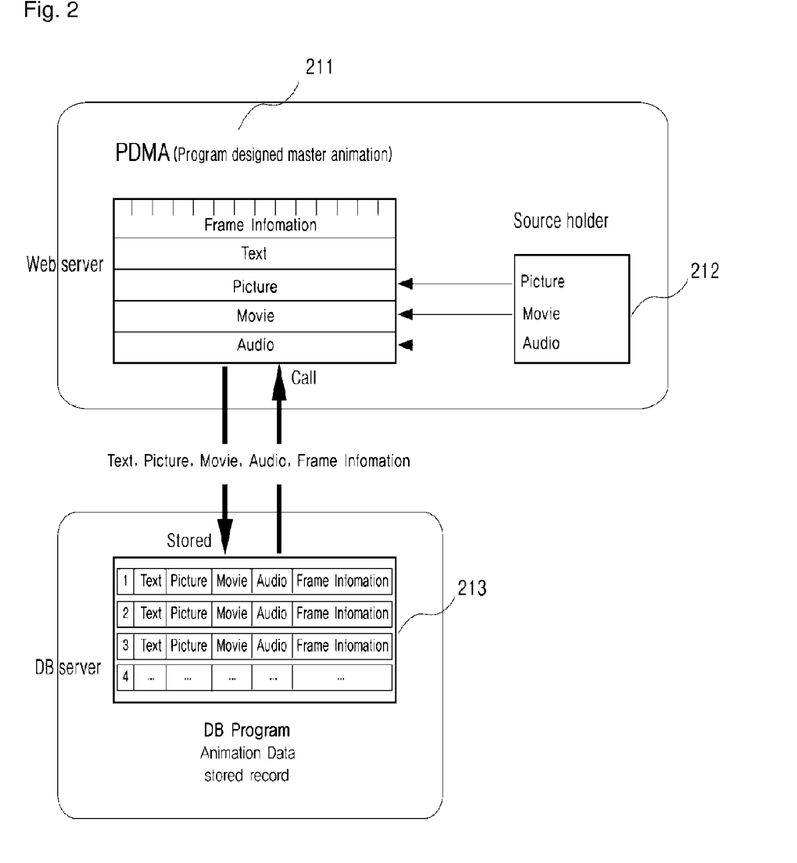
FIGS. 2 and 3 show the concept and construction of a PDMA-type animation according to the present invention.

FIG. 2 shows the concept of a PDMA. As shown in FIG. 2, the PDMA is programmed so that the source 211 constituting the animation has separate contents, i.e. texts, graphics, movies, audios, frame information, etc., which are combined when the animation is played. As such, the PDMA refers to a program designed so that components of the animation can be combined and played.

The content of the animation appearing when the PDMA is played may be varied for each PDMA sample according to the content of the program designed by the producer when the PDMA sample is created. Particularly, the producer can design different screen configurations for respective PDMA samples, and design the program so that separate pieces of animation data are combined differently. Information regarding data combined with the PDMA is stored by a DB program 213 connected to the PDMA. By modifying information stored in the DB program, the content of data combined with the PDMA, i.e. texts, graphics, movies, audios, frame information, etc. is also modified.

Among sources of the PDMA, materials including graphics, movies, and audios are stored in a specific material folder 212 on the web, and information regarding materials including texts, frame information, graphics, movies, and audios is stored in the DB program 213 connected to the PDMA. The DB program also stores PDMA program design information, information regarding identification of virtual animations distributed by the PDMA to respective clients, and information regarding individual inputs and selections made when clients remotely edit the virtual animations.

The PDMA can arbitrarily partition frame units, i.e. units constituting an animation, and separately store the partitioned frame information as individual information.

Figure 3:
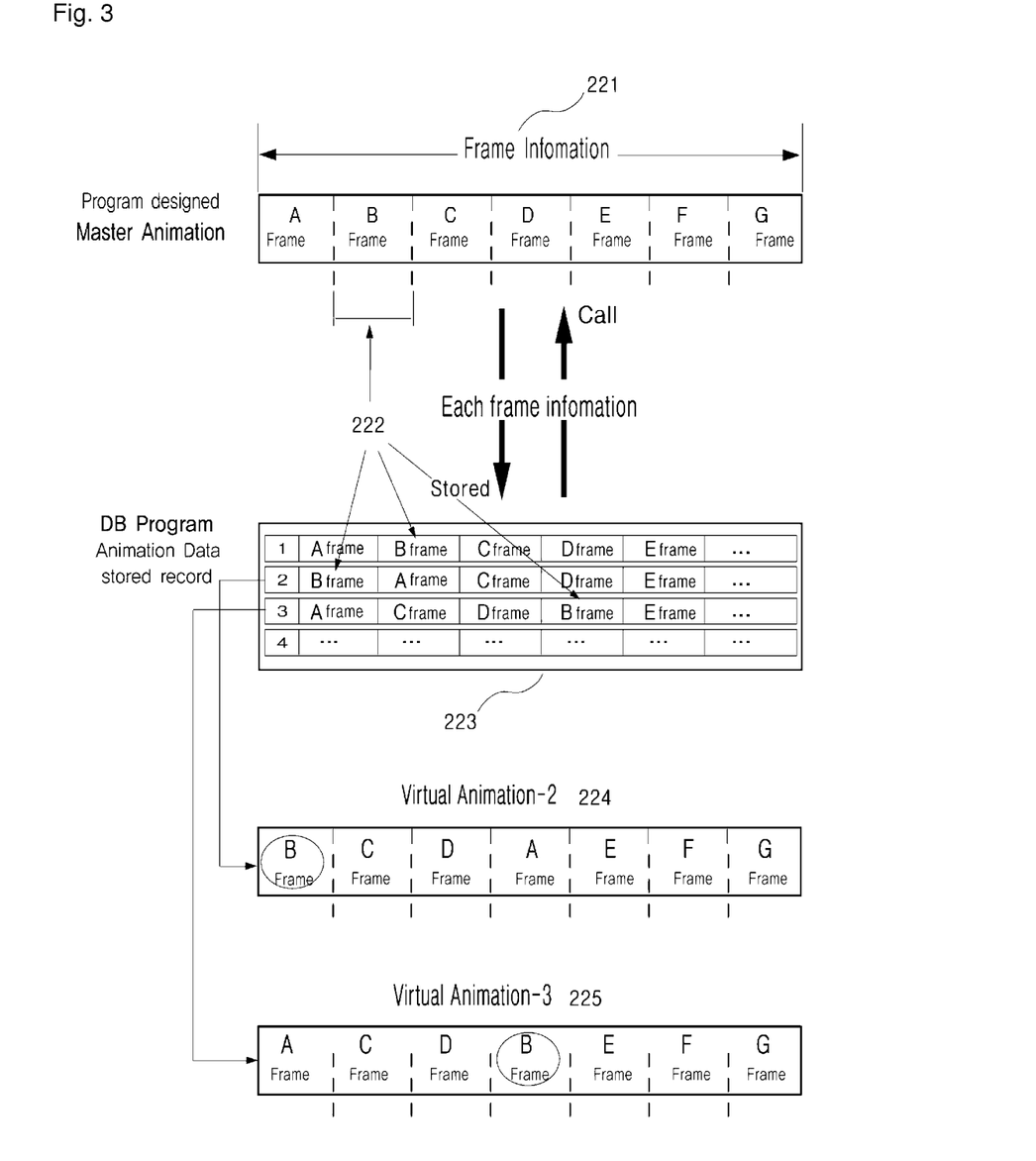

FIG. 3 shows the concept of partitioning a PDMA animation into frame units 222 and storing corresponding animation information in the DB program 223.

The frame information 221 can be arbitrarily divided into frame units 222 or time units 222 of the animation and stored by the operator. Particularly, the animation is partitioned into frame units 222 or time units 222, and each of the partitioned frame information 221 is stored in the DB program 223. Each frame information 221 stored in the DB program 223 is interpreted to determine what animation elements are to be combined in what position when the PDMA plays the animation. The order of playing the movies can be changed by modifying the position of the partitioned frames. Particularly, the program embedded in the PDMA interprets the frame information 221 to determine which frame the components of the animation (i.e. texts, graphics, movies, audios) must be connected to, and in what region of the screen of the corresponding frame the components must be positioned, so that the animation can be freely modified and edited by manipulating the corresponding frame position and information. As such, the PDMA interprets information by the embedded program, retrieves sources matching with the interpreted information from the material folder or retrieves data from the DB program, combines the animation, and plays the animation on the PDMA screen.

The PDMA can arbitrarily modify the frame information according to the intention of the PDMA producer and store it in the DB program. The client can also modify the frame information of the distributed virtual animation. The PDMA recombines frame sources of the animation according to the modified frame information stored in the DB program.

FIG. 3 shows exemplary virtual animations-2 224 and -3 225, which indicate frame information of virtual animations recombined by modifying and editing frame information 221 of the PDMA master animation. Therefore, the PDMA can partition not only the content of sources contents constituting an animation (i.e. texts, graphics, movies, audios), but also frame information into time units or frame units, store them in the DB program, and modify the frame information anytime desired. As such, the content of the animation can be freely edited and produced.

Figure 4:
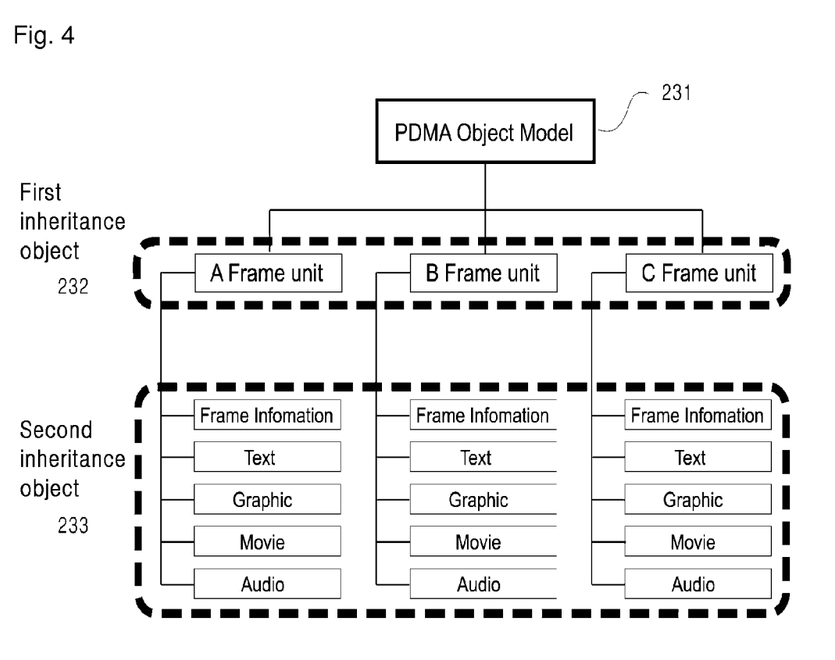
FIG. 4 is a block diagram illustrating an internal object model inherited by a PDMA.
Figure 8:
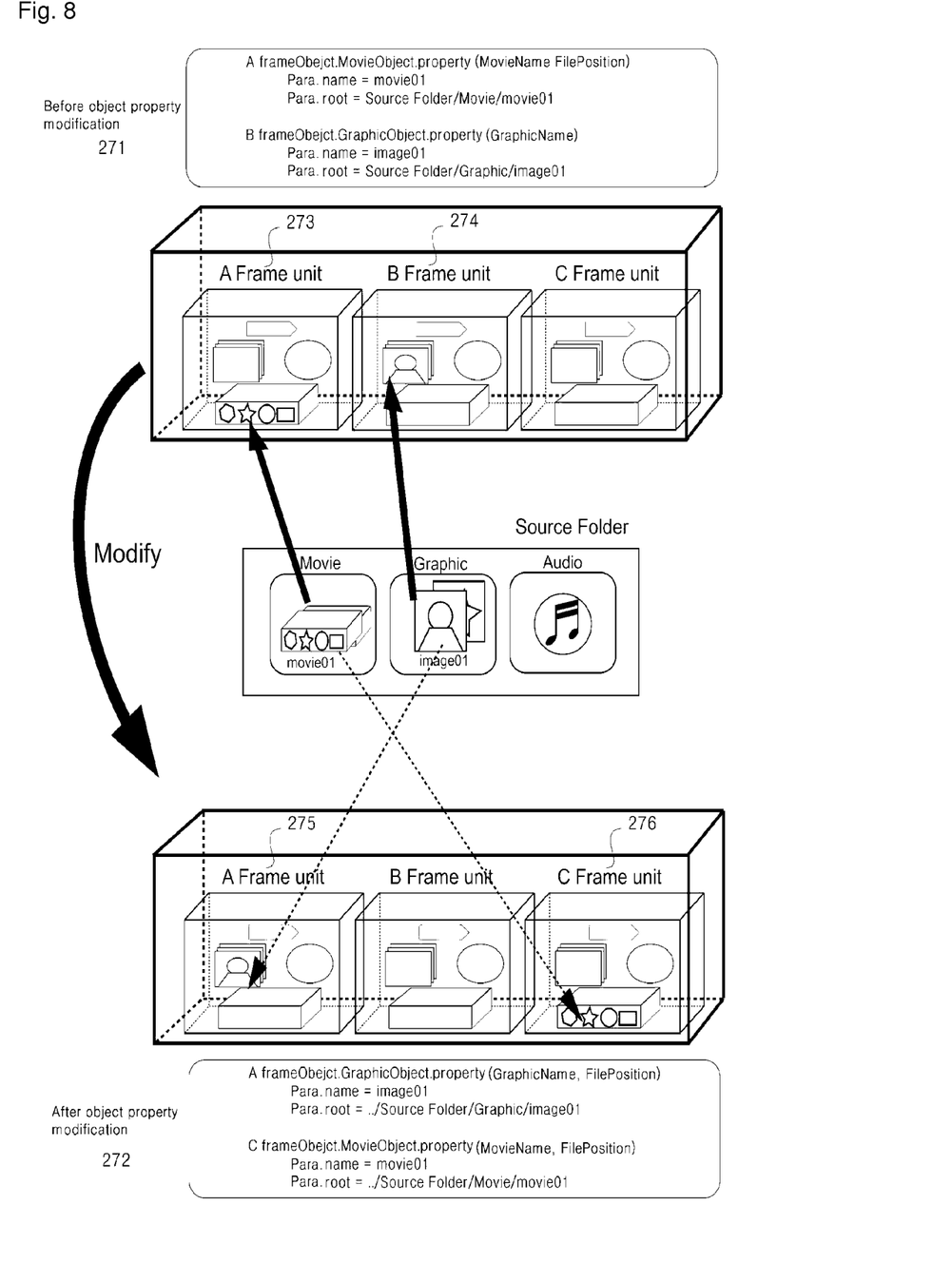
FIG. 8 shows a principle of modifying PDMA animation components by changing the property value of frame unit objects.

FIGS. 4 and 8 show the principle regarding how the above-mentioned PDMA separates components of an animation, retrieves them, and recombines them.

FIG. 4 shows a program structure illustrating a PDMA and entire internal object models inherited by the PDMA. As shown in the drawing, the PDMA 231 itself is a kind of object, and all elements constituting the interior of the object are inherited as lower objects. The reason all elements constituting the PDMA are objectified in the case of PDMA program design is for the purpose of separately storing elements constituting the PDMA animation and their information. The first inheritance objects 232 of the PDMA are movies divided frame by frame, and elements constituting the animation of the frame unit movies (i.e. texts, graphics, movies, audios, frame information) constitute the second inheritance objects 233. Those skilled in the art can easily understand that the PDMA program structure shown in FIG. 4 is only an example, and more lower structures and inheritance objects can be created as the PDMA producer intends. All objects of the PDMA may be assigned with their own animation properties when the PDMA is produced, and the property value can be processed into a parameter so that the corresponding object can be accessed and modified from the outside.

Figure 5:
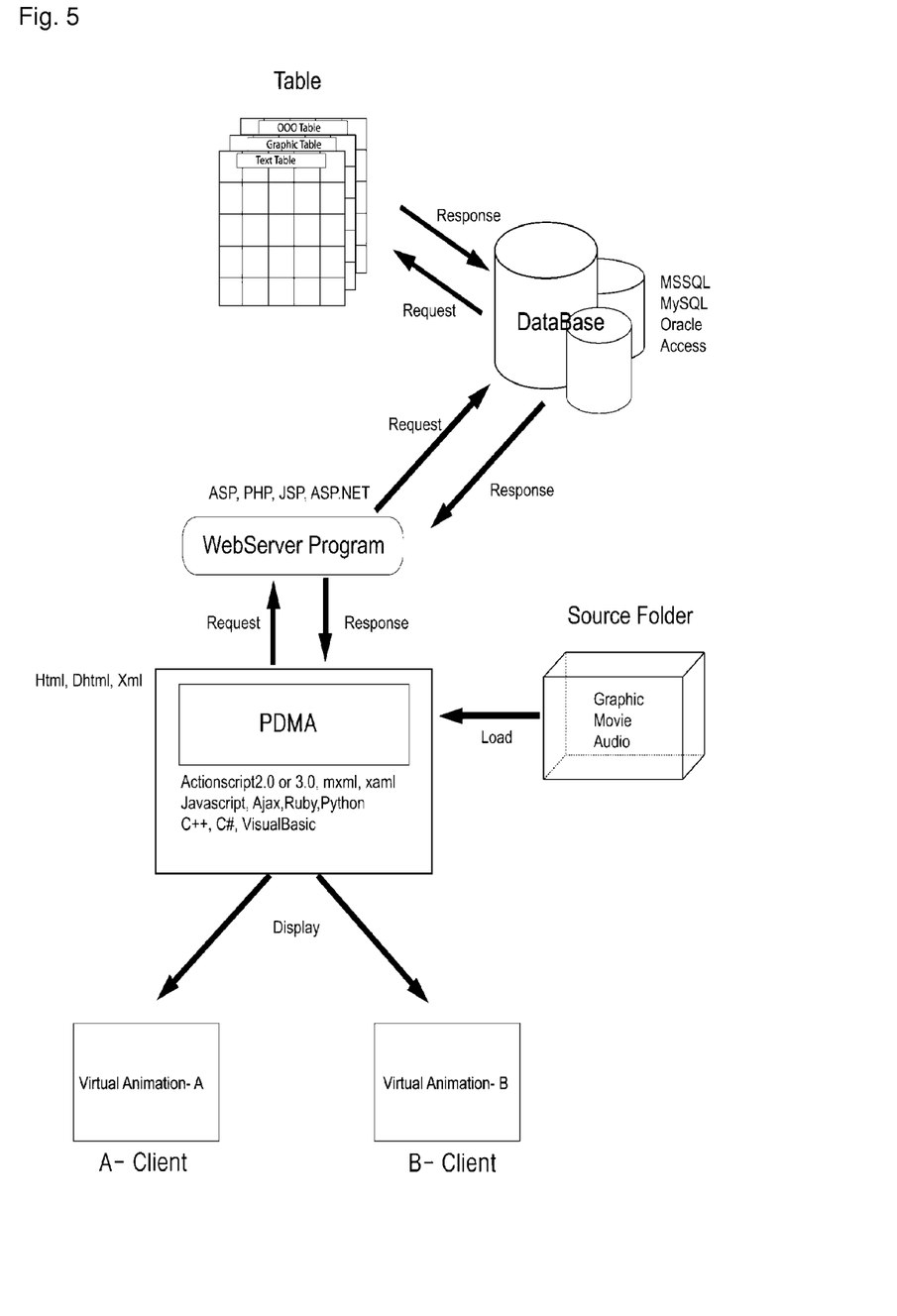
FIG. 5 is a block diagram showing processes of requesting and delivering parameter values, which are object properties constituting a PDMA.

FIG. 5 shows processes of setting the property value of each object constituting the PDMA as a parameter, storing the value in the corresponding table of the DB as data, and retrieving the data to use the property value of each object of the PDMA as a parameter. The PDMA will be played as an empty animation (i.e. no content) if the PDMA producer has not defined the property value of each object when the PDMA is produced or if the value has not been stored in the DB. One can produce a PDMA by using, for example, Flash Actionscript 2.0, Actionscript 3.0, mxml of Flex, or xaml of Silverlight. It is also possible to produce a PDMA by using a script language, such as Javascript, Ajax, Ruby, or Python, which can communicate with web servers in a synchronous or asynchronous manner based on a general web program, such as html, dhtml, or xml. Alternatively, a PDMA is developed as a CBD (Component Based Development)-based program by using a language such as C++, C#, or VisualBasic.

As shown in FIG. 5, the property value of each object inherited by the PDMA can be embedded in the PDMA. Alternatively, the property value is processed into a parameter, and its value is stored in the corresponding table of the connected DB as data. Upon receiving a playback request, the PDMA informs the web server program (e.g. ASP, PHP, JSP, ASP.NET) of the request, and the web server program retrieves corresponding data from each table of the DB. The web server program delivers the retrieved data to the connected PDMA as a parameter, and the corresponding object of the PDMA uses the parameter as a property value and transmits a virtual animation to the client.

Figure 6:
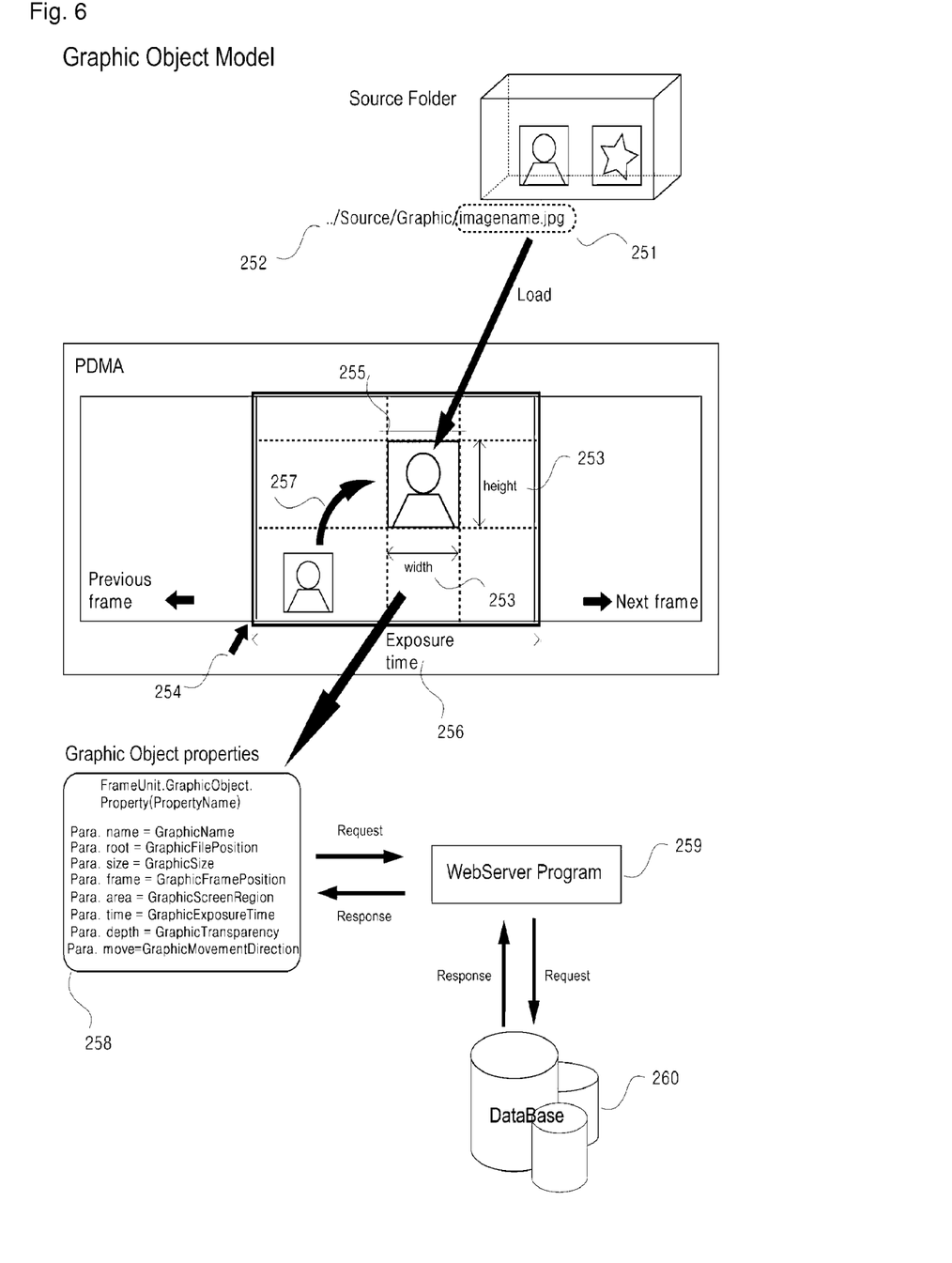
FIG. 6 is a block diagram illustrating the model and properties of graphic objects of a PDMA.

FIG. 6 shows an exemplary property of a graphic object among a number of objects constituting an animation of the PDMA. The graphic object can be retrieved from the material folder, loaded in the designated frame position, and deformed to the desired size. Alternatively, the graphic object can be exposed in a designated region of the frame screen and then moved. Therefore, the property of the graphic object may include the file name 251, the route 252 of the file to be opened, the file size 253, the frame position 254, the screen region 255, the exposure time 256, the transparency, the movement direction 257, etc. These property values 258 can be processed into parameters or embedded in the program according to the producer's intention. As shown in FIGS. 5 and 6, the PDMA requests the web server program 259 to provide property values 258 processed into parameters. The web server program interprets the requested condition, retrieves corresponding data from the connected DB 260, and sends it to the PDMA sample that has made the request. Then, the PDMA searches for the parameter of the corresponding object (graphic object) and substitutes the value. Similarly, texts, audios, movies, and frame information can be objectified just like the graphics so that corresponding objects can be assigned with various properties, and the property value can be processed into a parameter.

Figure 7:
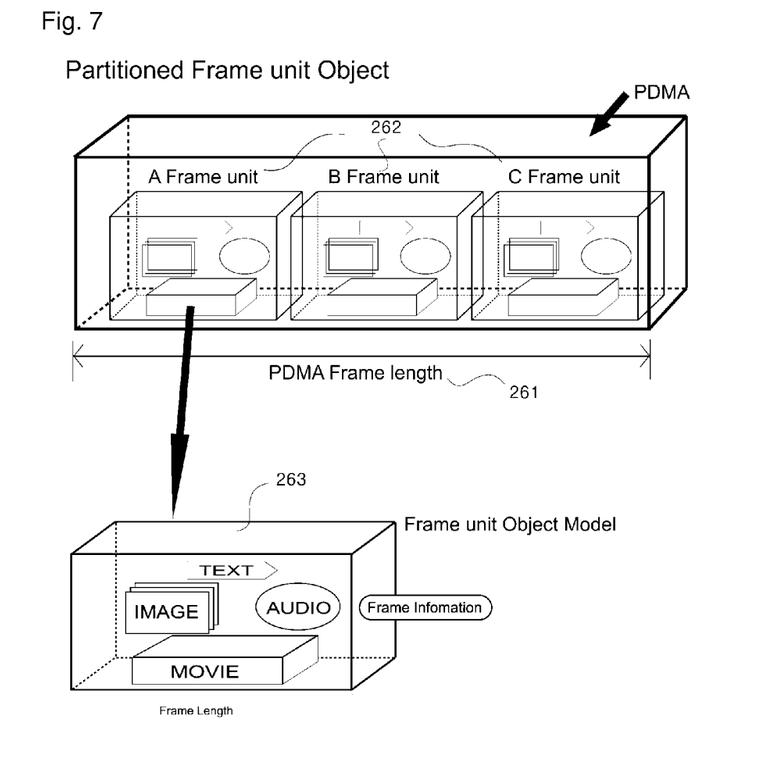
FIG. 7 is a block diagram showing a partitioned frame unit model of a PDMA.

FIG. 7 shows an exemplary model obtained by arbitrarily partitioning an animation constituting a PDMA into fame units and objectifying respective frame units. It is clear from the model that the PDMA arbitrarily partitions frame units within the entire PDMA frame length 261 according to the producer's intention, and that each of the partitioned frame units 262 is objectified to set various properties, values of which constitute the entire PDMA frame information. The property value can also be converted into a parameter and used by the PDMA.

Assuming for example that a PDMA sample has an entire frame length of three minutes (a total of 5,400 frames in the case of 30 frames per second), frame units are partitioned per minute or 1800 frames, and frame information is converted into objects as many as the partitioned frame units. As a result, a total of three inheritance objects are created for the PDMA sample. Frame units are not necessarily partitioned by the same proportion. For example, frame units(A) are partitioned per 30 seconds (900 frames), and frame units(B) are divided per 1 minute and 30 seconds (2,700 frames).

After frame unit objects are created form the PDMA sample, elements constituting the animation are again created as lower objects 263, which are assigned with property values. As a result, the PDMA sample includes a total of three virtual animations (primary inheritance objects). Although it may be somewhat complicated, the PDMA may arbitrarily partition the partitioned frame unit objects 262 again and convert the partitioned frame units into objects to produce other dependent (secondarily inherited) virtual animations. Particularly, the PDMA corresponds to the entire animation; individual animations are produced as primary inheritance objects and exist therein; and animations of secondary inheritance objects are produced in addition to the animations of the primary inheritance objects. Thus, the PDMA can be designed in various models as exemplified in FIG. 7. The PDMA can assign various properties to frame unit objects created in this manner, and process the property values into parameters. Therefore, the order of playing the animations of the corresponding objects can be modified or deleted. It is also possible to overlap the animations of two frame unit objects. In summary, by modifying the property value of the animation component objects inherited by the frame unit objects (i.e. texts, graphics, movies, audios, frame information), the animation components can be freely modified or edited.

FIG. 8 illustrates how the components of an animation are modified by frame unit objects of the PDMA. Before object property value modification 271, a movie named 'movie01' has been loaded as the movie object of the A frame unit 273, and an image named 'image01' has been loaded as the graphic object of the B frame unit 274. After the object property value modification 272, the movie named 'movie01' loaded as the movie object of the A frame unit 273 is loaded as the movie object of the C frame unit 276, and the image loaded as the graphic object of the B frame unit 274 is loaded as the graphic object of the A frame unit 275.

Besides audio or text objects, other objects can also be modified variously by processing the property value, which has been set during the program design, into a parameter. The PDMA itself can be used as an object, and a number of produced PDMA samples can be connected to obtain a single animation. In this manner, the PDMA producer can produce a PDMA sample, to which more complex and diversified methods and functions are assigned than those shown in the drawings.

Figure 9:
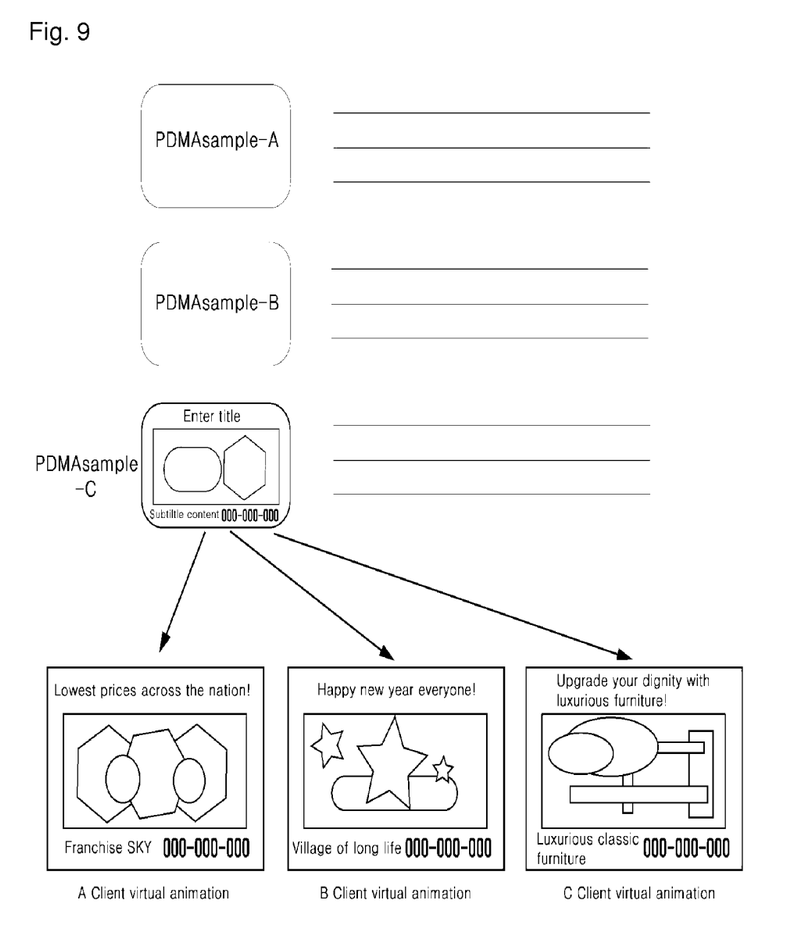
FIG. 9 shows an exemplary process of posting and providing animation samples produced in the PDMA type on the web.

FIG. 9 shows an example of posting animation samples produced in the PDMA type on the web. Various models of PDMA samples can be produced according to characteristics of users in various fields. The service provider can post a number of PDMA samples on the web so that a number of member clients can select from and use them.

Figure 10:
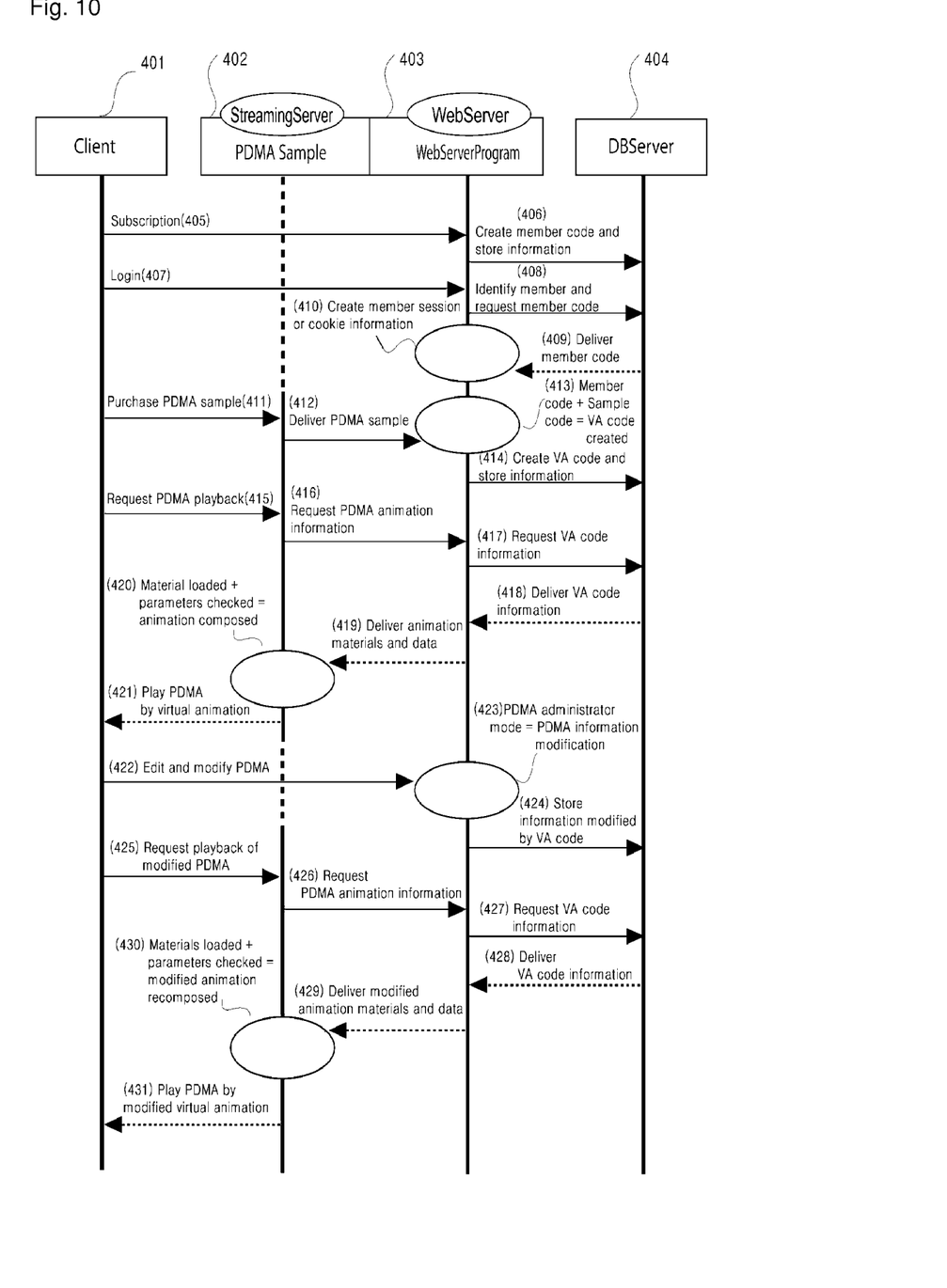
FIG. 10 briefly shows processes of purchasing a PDMA sample by a member client, converting the PDMA into a virtual animation, and distributing the virtual animation to the client.

FIG. 10 is a flowchart showing a method for a client to purchase a PDMA sample and distributing a virtual animation to the client by the PDMA. Particularly, the PDMA service provider distributes the PDMA, i.e. virtual animations, to a number of clients via wired/wireless networks, and the clients use them as their own animations via web browsers. The system for providing and operating the PDMA service shown in FIG. 10 includes a client 401 terminal, a PDMA streaming server 402, a web server 403, a DB server 404, and a network system interconnecting them.

As shown in FIG. 10, a client subscribes to a site, which provides a PDMA service, to use the PDMA (405). The web server program of the corresponding site creates a member code specific to the enrolled client, and stores the member code together with related information in the DB server (406).

When the client accesses the site and logs in (407), the web server (program) requests the DB server to provide the member code to identify the member (408). The DB server transmits the member code as requested (409). The web server identifies the accessing client, and creates information regarding the session or cookie of the member (410).

Each PDMA sample is assigned with a unique PDMA identification code for identifying the PDMA sample. When a client logs in and selects (or purchases) a PDMA sample posted on the site (411), information regarding the PDMA identification code the purchased (selected) PDMA sample is transmitted to the web server program (412). The web server program checks the transmitted PDMA identification code and the log-in member code from the session or cookie information, combines the PDMA identification code with the member code to create a VA code (413), and stores animation construction information regarding the PDMA sample in the DB server (414). A number of tables exist in the DB program of the DB server 404 to store a huge amount of animation information regarding respective PDMA samples. Each table is designed to separately store main objects constituting the animation (i.e. texts, graphics, movies, audios, frame information), create a record having a VA code as an identifier, and store corresponding animation information.

When the client requests that the purchased PDMA sample be played (415), the PDMA sample requests the web server program to provide animation construction information and materials (416). In response to the request, the web server program combines the member code of the client, who has requested that the PDMA sample be played, with the PDMA identification code of the PDMA sample to create a VA code, and requests the DB server to provide information matching with the created VA code (417). Then, the DB program of the DB server retrieves records, which have VA codes as identifiers, from respective tables and transmits corresponding information to the web server program (418). The web server program forwards the information to the corresponding PDMA sample that has requested animation information (419).

The PDMA sample substitutes the animation information, which has been transmitted from the web server program, for the property value of each object constituting the animation to compose a virtual animation (420). Particularly, component materials constituting the animation (e.g. graphics, movies, audios) are loaded from the material folder, and construction information regarding the construction of the animation (e.g. text and frame information) is substituted for a parameter-processed property value to compose a virtual animation (420). A signal is sent so that the virtual animation composed from the PDMA sample in this manner is played 421 only to the client who has request playback of the PDMA sample. Thus, the member code specific to the client is combined with the unique PDMA identification code given to the PDMA sample to create VA code information, based on which an animation is composed.

The PDMA service provider provides the client with a PDMA administrator mode 423 so that the purchased PDMA sample can be edited and modified (422). In the PDMA administrator mode, the client can remotely modify and edit the purchased PDMA sample via wired/wireless networks (422). After logging into the site and accessing the PDMA administrator mode 423, the client can check the list of purchased PDMA samples and select a PDMA sample, which he/she wants to modify and edit, from the list to check information regarding the detailed construction of the virtual animation. The information regarding the construction of the virtual animation includes frame units of the animation, titles, captions, the name and number of uploaded photos, the name and number of selected movies, the name of selected audios, etc. The information also includes frame information regarding in which frame position of what object the component materials of the animation are supposed to be, how the component materials are to move, to what extent they are exposed, the color and transparency of respective objects, etc. The member client can modify or edit corresponding construction information as desired, and can upload animation component materials held by the client if necessary.

The particulars of modification and edition by the client in the PDMA administrator mode 423 are transmitted to the DB server by using a VA code, which has been created by combining the PDMA identification code with the member code by the web server program, as an identifier (424). The DB program of the DB server retrieves records matching with the VA code from respective tables, and updates modified data. If the client requests in the PDMA administrator mode that the modified PDMA sample be played (425), the PDMA sample requests the web server program to provide animation construction information and materials (426). In response to the request, the web server program combines the member code of the client, who has requested the PDMA sample playback, with the PDMA identification code of the PDMA sample to create a VA code, and requests the DB server to provide information matching with the created VA code (427). In response to the information request, the DB program of the DB server retrieves records having the VA code as an identifier from respective tables, and transmits updated information to the web server program (428). The web server program forwards the information to the corresponding PDMA sample that has requested animation information (429). The PDMA sample then substitutes the modified animation information, which has been received from the web server program, for the property value of each object constituting the animation to recompose a modified virtual animation (430). The PDMA sample playback screen 431 shown to the client who has requested playback is not the previous PDMA screen, but a modified virtual animation resulting from recombination of image sources according to the modified information.

Different virtual animations are played to respective accessing clients because different VA codes are stored for respective clients, and because different image sources are retrieved or different animations are constructed according to different VA code information. Therefore, clients can remotely produce their own animations by using PDMA samples via their terminals, and can play the produced animations by monitors, TVs, cellular phones, or other display devices connected to the terminals.

Mode for the Invention

In general, three ways of service are provided to enable customers to use the PDMA.

The first way employs wired/wireless networks, as mentioned above. Particularly, a PDMA service provider posts PDMA samples on the web and distributes virtual animations (PDMA samples) to enrolled clients via the wired/wireless networks so that the clients can make use of the distributed virtual animations by using web browsers.

According to the second way, a PDMA service provider posts PDMA samples on the web and enables clients, who have accessed via wired/wireless networks, to select desired PDMA samples and download the samples to their own local PCs so that the clients can use them on their own PCs without web browsers.

According to the third way conceivable, a PDMA service provider stores PDMA samples, PDMA service component materials and related programs in CDs, DVDs, or other recording media, and distributes them to interested customers so that the customers can use them without wired/wireless networks (i.e. directly on PCs).

Those skilled in the art can understand that the above-enumerated PDMA service methods are only examples of methods that can be provided by PDMA service providers, and various service methods other than those given above can be developed by PDMA service providers according to the environment and requirement of clients using the PDMA service.

Figure 11:
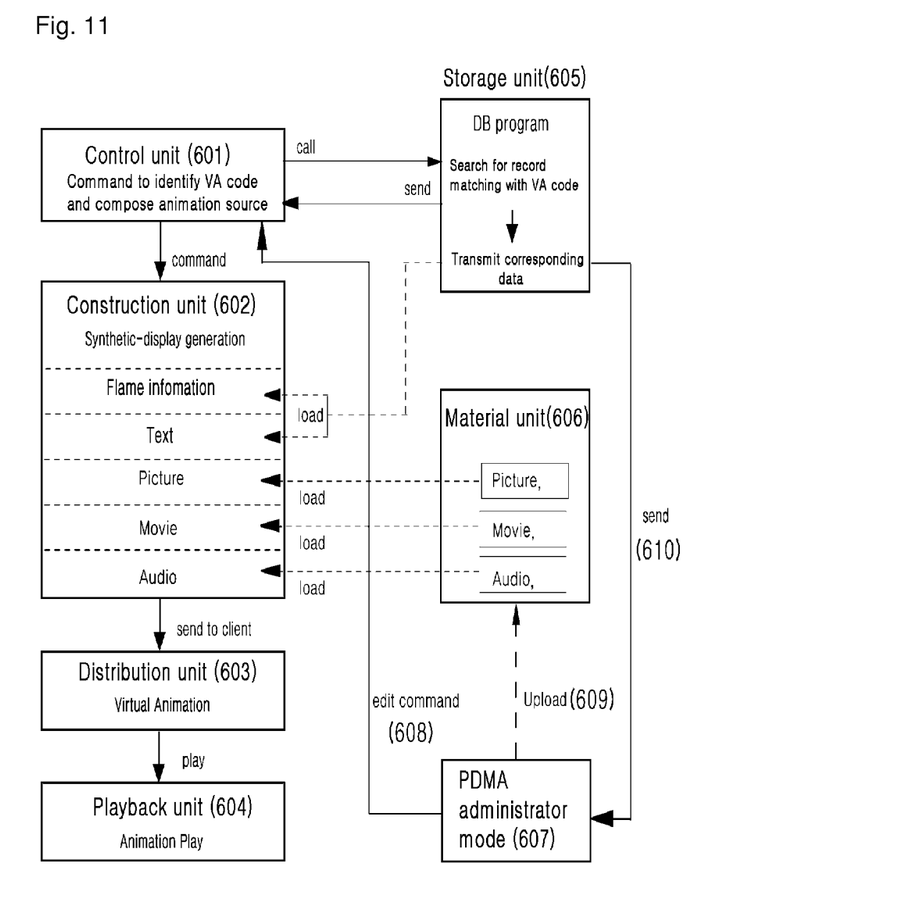
FIG. 11 shows the construction of a PDMA program according to the present invention.

FIG. 11 shows functional blocks of the PDMA system. Particularly, the system includes, as functional units, a control unit 601, a construction unit 602, a distribution unit 603, a playback unit 604, a material unit 605, and a storage unit 606. The control unit is also connected to the PDMA administrator mode 607 of the client.

The control unit 601 plays the important role of controlling all data/information necessary to play PDMA-type animations. Particularly, the control unit 601 identifies the member code of an accessing client, combines the member code with the PDMA sample code to create a VA code, and transmits the VA code information to the storage unit 605, i.e. DB program. The storage unit 605 retrieves a record matching with the VA code from each table, and transmits stored data/information to the control unit 601. The control unit 601 forwards the VA code information, which has been received through the above-mentioned processes, to the construction unit 602, as well as to the distribution unit 603.

The construction unit 602 analyzes information from the control unit 601, and loads respective animation sources to the material folder of the material unit 606. The material folder has respective sub-folders for containing graphics, movies, audios, etc. Among sources stored in the material unit, the construction unit 602 loads sources matching with data/information transmitted based on the VA code (e.g. graphics, movies, audios). The construction unit 602 retrieves the animation frame information and text information from the DB program without modification, and substitutes the information for the property value of each corresponding object constituting the animation of the PDMA to combine the animation. Information regarding combination of respective animation sources loaded to PDMA samples includes, for example, the order of arrangement of sources, frame position, size, brightness, exposure time, other effects, etc. These pieces of information are basically created according to a scenario designed by the program when PDMA samples are produced. Some pieces of information may be arbitrarily manipulated by uploading (609) a new source by the client in the PDMA administrator mode 607 or by modifying frame information (608). The frame information and text information of the construction unit 602 are obtained by retrieving basic information, which has been inputted and designed when PDMA samples are produced, from the DB program without modification and combining it with the above-mentioned sources, such as graphics, movies, and audios. This is also conducted by embedded program information designed when PDMA samples are produced, and the client can arbitrarily manipulate the information in the PDMA administrator mode 607 (608). The construction and scenario of animation sources combined by the construction unit 602 of the PDMA can be designed differently for respective PDMA samples. In other words, as many models and functions as possible can be assigned according to the producer's plan and intention when PDMA samples are produced.

The distribution unit 603 plays the role of distributing animation sources, which have been combined by the construction unit 602, to terminals of clients, who have requested playback of PDMA samples, as virtual animations. Particularly, the distribution unit 603 identifies a member code based on VA code information transmitted by the control unit 601, and distributes data regarding a virtual animation combined by the construction unit 602 to the terminal of a client matching with the member code. The construction unit 602 combines animations as different data for each VA code, and the distribution unit distributes different animation data to each member client who has requested playback of PDMA samples. Therefore, different contents of animations are played to clients even when they have requested playback of the same PDMA sample. This is because different data is retrieved from the DB according to the identification code of the accessing member client.

The playback unit 604 receives information regarding animations combined by the construction unit 602 from the distribution unit 603, and plays the corresponding animations. The playback unit 604 generally uses FlashPlayer, SilverlightRuntime, or web browser itself to play animations. It is also possible to separately create a program acting as the playback unit by using a program such as C++, C#, Visual-Basic, etc. so that sources of various formats constituting animations (e.g. graphics, movies, audios) can be used for PDMA animations. In this case, a component-based program (e.g. JavaBeans of Java, ActiveX of Microsoft) needs to be developed and installed in the web server so that clients can download and install the component in their local PCs.

The material unit 606 stores basic materials necessary to play PDMA samples, such as graphics, movies, audios, etc. The PDMA service provider can store basic animation sources in the material unit, as well as frequently create various sources and upload them to the material unit 606 so that member clients can use them. In the PDMA administrator mode, member clients can use animation sources stored in the material unit 606 without modification or use them after modifying them as desired. If necessary, a member client can upload sources created by him/her (e.g. graphics, movies, audios) to the corresponding folder (609) and edit them for his/her virtual animation. The material unit 606 basically has sub-folders containing graphics, movies, audios, etc., and other sub-folders can be added if necessary.

The storage unit 605 stores information inputted by the PDMA service provider via the terminal, as well as data resulting from program execution by the clients. More particularly, when the PDMA service provider posts PDMA samples on the web, PDMA sample information is registered to store data, just like a shopping mall operator registers information regarding goods to be sold. However, in the DB program of the storage unit 605, not only PDMA sample information, but also corresponding information regarding the program designed when PDMA samples are created, the VA code created when a member client purchases a PDMA sample, etc., by creating separate records. The storage unit 605 also stores data 608 created when a member client remotely edit or modify his/her virtual animation, which has been distributed based on the VA code, in the PDMA administrator mode 607.

The PDMA administrator mode 607 is used by member clients to remotely modify and edit information regarding virtual animations, which have been distributed from PDMA samples purchased by them, and is closely associated with the control unit 601 of the PDMA samples. The result of execution by clients in the PDMA administrator mode 607 is transmitted to the control unit of the PDMA samples (608), and the control unit 601 classifies corresponding data based on the VA code and sends it to the DB program of the storage unit 605. The DB program searches for a record matching with the VA code, stores corresponding data, and sends the result to the PDMA administrator mode of the member clients (610). More particularly, even if a member client does not manipulate a purchased PDMA sample in the PDMA administrator mode 607, the virtual animation of the client can be played by program data embedded when the PDMA sample is created. However, the content of played virtual animation may not conform to the client's intention. Therefore, the member client can modify/edit (608) information regarding the PDMA sample as desired in the PDMA administrator mode 607 to produce a virtual animation of his/her own.

Figure 12:
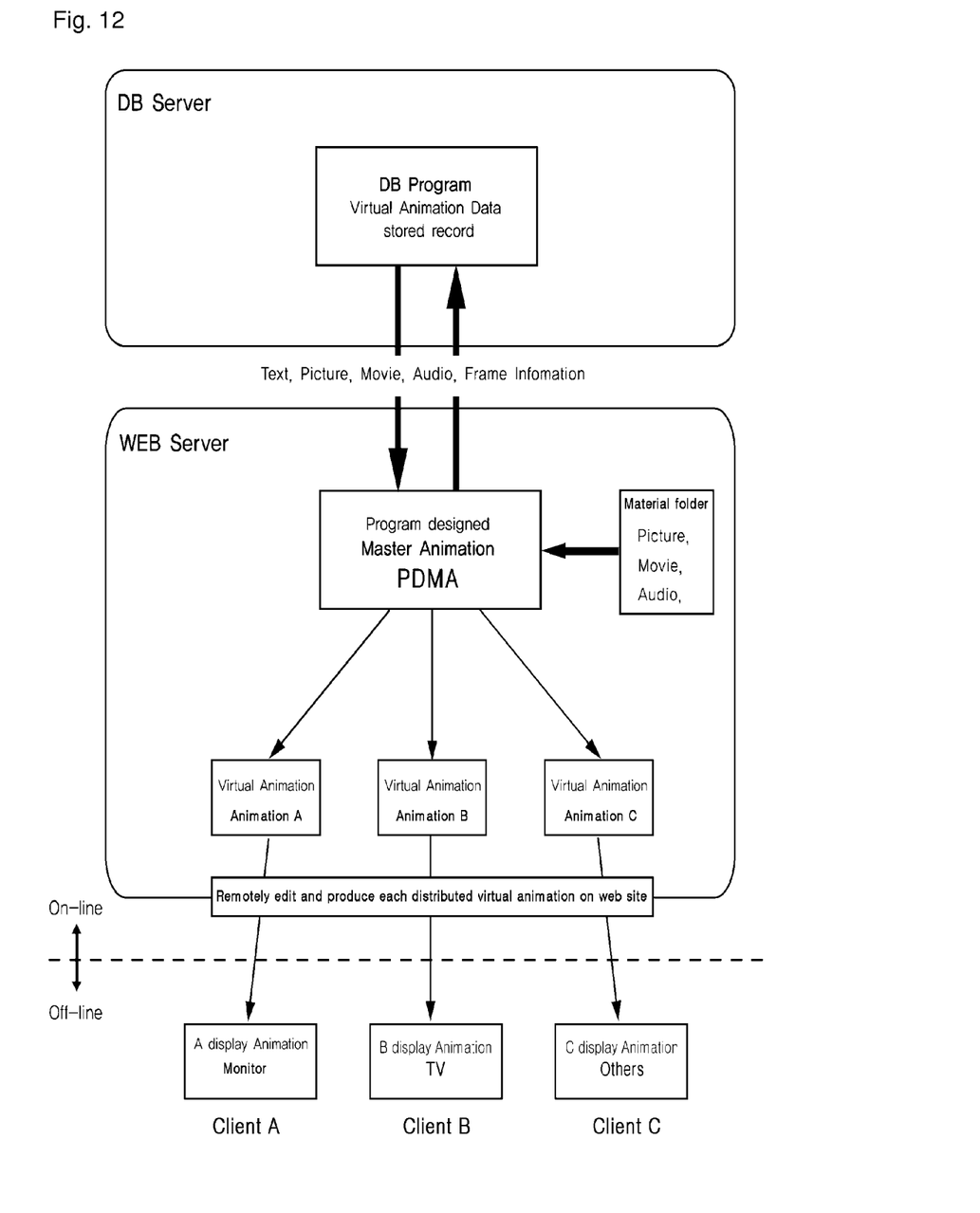
FIG. 12 shows an exemplary screen according to an embodiment of the present invention.

FIG. 12 is a block diagram briefly showing the system for operating the PDMA according to the present invention, which has been described above. The system shown in FIG. 12 includes a web server acting as a central processing unit for executing programs and processing data, a DB server for executing a DB program and storing data, and client terminals connected online or offline (batch processing by storing media).

It will be assumed for example that a CF animation is to be produced to advertise for company "S". If the animation is produced according to the prior art, its content conforms to the intention of company "S" only, and thus is not available to other companies. However, if the animation is produced in the PDMA type according to the present invention and is provided by the inventive system, the animation is useful not only to company "S", but also to its entire franchises and other companies dealing with products from the same company.

In addition, if a CF animation is produced according to the conventional method, its content cannot be modified by any means because it has gone through the encoding process. However, if an animation is produced in the PDMA type according to the present invention, the inventive technology and system enable any person to remotely modify and edit the content of the animation via wired/wireless networks.

As such, the CF animation of company "S" produced in the inventive PDMA type is not only used by company "S", but also is distributed to all companies of interest as virtual images (online or offline) so that they can modify the animation contents as desired at any time.

The animation production and service according to the present invention can be conducted on wired/wireless networks, to which conventional computers and portable terminals can connect.

When the present invention is to be practiced in connection with a wireless network, the PDMA must be produced based on a language supporting the wireless Internet, such as wml, mhtl, etc., and a WAP (Wireless Application Protocol) server supporting a wireless Internet protocol, for example, needs to be provided. In this case, clients conduct data communication via a WAP server, which is adapted to a wireless Internet protocol, by portable terminals via the wireless Internet protocol and mobile communication network.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for producing animation in a computer system, comprising the steps of:

storing a plurality of Program Designed Master Animation (PDMA) components including graphics, movies, and/or audio in a first storage;

storing a plurality of PDMA frame information data values containing information including an order of arrangement, a frame position, a frame size, a frame brightness, a frame exposure time, and texts of the PDMA components in a second storage separated from the first storage;

retrieving the PDMA frame information data values from the second storage;

interpreting the PDMA frame information data values;

retrieving the PDMA components from the first storage according to the interpreted PDMA frame information data values;

playing the animation over a wired/wireless network by combining the PDMA components into a PDMA according to the interpreted PDMA frame information data values without encoding the combination of the PDMA components and simultaneously displaying a plurality of visual PDMA components;

modifying the PDMA frame information data values to obtain a Virtual Animation;

storing the modified PDMA frame information data values in the second storage as Virtual Animation frame information data values;

assigning a Virtual Animation code to a customer;

retrieving the Virtual Animation frame information data values from the second storage according to the Virtual Animation code;

interpreting the retrieved Virtual Animation frame information data values;

retrieving the PDMA components from the first storage according to the interpreted Virtual Animation frame information data values; and playing the Virtual Animation over a wired/wireless network by combining the retrieved PDMA components into a Virtual Animation according to the interpreted Virtual Animation information data values without encoding the combination of the retrieved PDMA components.

2. The method as claimed in claim 1, further comprising the step of making a subscriber animation, comprising:

enabling a subscriber to modify, via a network, the PDMA frame information data values or the Virtual Animation frame information data values to obtain subscriber animation frame information data values; and storing the subscriber animation frame information data values in the second storage.

3. A system for processing to produce, modify, and edit an animation, the system comprising:

a construction unit for storing a plurality of Program Designed Master Animation (PDMA) components including graphics, movies, and/or audio in a material unit, storing a plurality of PDMA frame information data values containing information including an order of arrangement, a frame position, a frame size, a frame brightness, a frame exposure time, and texts of the PDMA components in a storage unit separated from the material unit, and retrieving the stored PDMA components and PDMA frame information data values to play the PDMA; and a control unit for retrieving the PDMA frame information data values from the storage unit, interpreting the PDMA frame information data values, retrieving the PDMA components from the material unit according to the interpreted PDMA frame information data values, playing the animation over a wired/wireless network by combining the PDMA components into a PDMA according to the interpreted frame information data values without encoding the combination of the PDMA components and simultaneously displaying a plurality of visual PDMA components, modifying the PDMA frame information data values to obtain a Virtual Animation, storing the modified PDMA frame information data values in the storage unit as Virtual Animation frame information data values, assigning a Virtual Animation code to a customer, retrieving the Virtual Animation frame information data values from the storage unit according to the Virtual Animation code, interpreting the retrieved Virtual Animation frame information data values, retrieving the PDMA components from the material unit according to the interpreted Virtual Animation frame information data values, playing the Virtual Animation over a wired/wireless network by combining the retrieved PDMA components into a Virtual Animation according to the interpreted Virtual Animation information data values without encoding the combination of the retrieved PDMA components.

4. The system as claimed in claim 3, further comprising:

a distribution unit for distributing a virtual animation of the PDMA played by the construction unit to a terminal of a client; and a playback unit for receiving the virtual animation from the distribution unit and for playing the virtual animation.

5. A non-transitory computer-readable recording medium storing a PDMA as claimed in claim 1.

6. A non-transitory computer-readable recording medium storing a subscriber animation as claimed in claim 2.

* * * * *